(12) United States Patent
Iwabuchi et al.

(10) Patent No.: US 11,673,430 B2
(45) Date of Patent: Jun. 13, 2023

(54) TIRE

(71) Applicant: BRIDGESTONE CORPORATION, Tokyo (JP)

(72) Inventors: Sotaro Iwabuchi, Tokyo (JP); Takayuki Fukunaga, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 221 days.

(21) Appl. No.: 16/769,269

(22) PCT Filed: Dec. 5, 2018

(86) PCT No.: PCT/JP2018/044786
§ 371 (c)(1),
(2) Date: Jun. 3, 2020

(87) PCT Pub. No.: WO2019/116993
PCT Pub. Date: Jun. 20, 2019

(65) Prior Publication Data
US 2020/0369094 A1   Nov. 26, 2020

(30) Foreign Application Priority Data
Dec. 14, 2017 (JP) .............................. JP2017-239749

(51) Int. Cl.
*B60C 13/00* (2006.01)
*B60C 13/02* (2006.01)

(52) U.S. Cl.
CPC ............ *B60C 13/001* (2013.01); *B60C 13/02* (2013.01)

(58) Field of Classification Search
CPC .............................. B60C 13/001; B60C 13/02
See application file for complete search history.

(56) References Cited

U.S. PATENT DOCUMENTS

| 2003/0084979 A1* | 5/2003 | Matsumoto | ........... B60C 13/001 |
| | | | 152/523 |
| 2009/0008015 A1 | 1/2009 | Itoi | |
| 2009/0218019 A1 | 9/2009 | Parturle | |
| 2010/0258231 A1 | 10/2010 | Nakamura | |

(Continued)

FOREIGN PATENT DOCUMENTS

| CN | 103660806 A | 3/2014 |
| EP | 2974890 A2 | 1/2016 |

(Continued)

OTHER PUBLICATIONS

Chinese Search Report dated Sep. 14, 2021, issued in Chinese Application No. 2018800805562.

(Continued)

*Primary Examiner* — Robert C Dye
(74) *Attorney, Agent, or Firm* — Sughrue Mion, PLLC (57) ABSTRACT

Provided is a tire including: a decorative portion that is formed on an outer surface of the tire and has a base surface; and a pattern region that is provided at the decorative portion and includes plural projections projecting from the base surface and formed at an interval of from more than 0.1 mm to 1.0 mm, the plural projections having a height of from 0.1 mm to 1.0 mm, in which at least in the pattern region, the plurality of projections is inclined in one direction with respect to a normal line perpendicular to the base surface.

4 Claims, 8 Drawing Sheets

(56) References Cited

U.S. PATENT DOCUMENTS

| | | |
|---|---|---|
| 2016/0016493 A1 | 1/2016 | Deppe et al. |
| 2018/0141390 A1 | 5/2018 | Miyasaka et al. |

FOREIGN PATENT DOCUMENTS

| | | |
|---|---|---|
| JP | 2003-146025 A | 5/2003 |
| JP | 2003-175707 A | 6/2003 |
| JP | 2003-182317 A | 7/2003 |
| JP | 2004-17828 A | 1/2004 |
| JP | 2009-512584 A | 3/2009 |
| JP | 2010-241397 A | 10/2010 |
| JP | 2013-169807 A | 9/2013 |
| JP | 2013-169809 A | 9/2013 |
| JP | 2014-019367 A | 2/2014 |
| JP | 2014-061820 A | 4/2014 |
| JP | 2016-215693 A | 12/2016 |
| JP | 2016-215700 A | 12/2016 |
| JP | 2016-215701 A | 12/2016 |
| JP | 2016-215702 A | 12/2016 |
| JP | 2016-215706 A | 12/2016 |
| WO | 0009348 A1 | 2/2000 |
| WO | 2006/098107 A1 | 9/2006 |
| WO | 2016182076 A1 | 11/2016 |

OTHER PUBLICATIONS

International Search Report for PCT/JP2018/044786 dated Mar. 12, 2019 [PCT/ISA/210].

Communication dated Jul. 6, 2021 by the European Patent Office in application No. 18887939.9.

Chinese Search Report of the Notifications to Grant dated Apr. 8, 2022 in Chinese Application No. 2018800805562.

* cited by examiner

TIRE

CROSS REFERENCE TO RELATED APPLICATIONS

This application is a National Stage of International Application No. PCT/JP2018/044786 filed Dec. 5, 2018, claiming priority based on Japanese Patent Application No. 2017-239749 filed Dec. 14, 2017.

TECHNICAL FIELD

The present disclosure relates to a tire having projections formed on an outer surface.

BACKGROUND ART

Conventionally, a pattern region having contrast has been formed through forming of fine projections on a side portion of a tire. For example, Japanese National-Phase Publication (JP-A) No. 2009-512584 discloses a technique that provides large contrast on the side portion of the tire with a plurality of projections.

SUMMARY OF INVENTION

Technical Problem

The decorative portion of the side portion of the tire has one region in which projections are formed. Since the projections control reflection of light, the brightness of this one region is low compared with the brightness of another region in which the light is reflected as it is.

In the specific configuration described in JP-A No. 2009-512584, the projections extend from the surface of the tire side surface in a vertical direction with respect to the surface, and in a front view from the vertical direction with respect to the tire side surface, in other words, in a front view from the projecting direction of the projections, the tire side surface on which the projections are provided appear to be black color compared with a region in which the projections are not provided.

However, when seen from an oblique direction with respect to the tire side surface (direction having an angle with respect to a normal line erected vertically on the tire side surface), the tire side surface in which the projections are provided appears to be brighter than the tire side surface in the front view, and does not appear to be black color as in the front view from the vertical direction, whereby it is difficult to provide large contrast with respect to another portion that appears to be bright.

An object of the present disclosure is to provide a tire from which large contrast can be obtained when the decorative portion is seen in an oblique direction.

Solution to Problem

A tire according to a first aspect is a tire including a decorative portion that is formed on an outer surface of the tire and that has a base surface; and a pattern region that is provided at the decorative portion and that includes a plurality of projections projecting from the base surface and formed at an interval of from more than 0.1 mm to 1.0 mm, the plurality of projections having a height of from 0.1 mm to 1.0 mm, in which at least in the pattern region, the plurality of projections is inclined in one direction with respect to a normal line perpendicular to the base surface.

In this tire, a pattern region is formed in the decorative portion on the outer surface of the tire. In this pattern region, a plurality of projections projecting from the base surface and having a height of from 0.1 mm to 1.0 mm is formed at an interval of from more than 0.1 mm to 1.0 mm. The projections formed in the pattern region are inclined with respect to the normal line perpendicular to the base surface.

Light that enters the pattern region declines while being repeatedly reflected on side surfaces, of the projections, facing each other and is reflected to the outside. Therefore, the brightness of the pattern region is low compared with the brightness of the other region (flat surface) in which the projections are not formed on the outer surface of the tire. Of the light reflected to the outside of the pattern region, the amount of light reflected in the projecting direction of the projections is smaller than the amount of light reflected in a different direction from the projecting direction. Therefore, when seen from the projecting direction of the projections, the pattern region appears to be black color compared with a case where the pattern region is seen from the different direction from the projecting direction of the projections. This means that when the pattern region is seen from the projecting direction of the projections, the pattern region appears to be the blackest.

According to this tire, since the projections of the pattern region are inclined with respect to the normal line perpendicular to the base surface, when the decorative portion is seen from the direction in which the projections are inclined, in other words, from an inclined direction with respect to the normal line perpendicular to the base surface (projecting direction of the projections), the pattern region can be made to appear to be black.

In this way, when the decorative portion is seen from an oblique direction, large contrast can be obtained between the pattern region and the other region.

A second aspect provides the tire according to the first aspect, in which the decorative portion is provided with a plurality of the pattern regions, and in each of the plurality of the pattern regions, the projections are inclined in a different direction.

When the projections are inclined in the same direction, when seen from the direction in which the projections are inclined, the pattern region appears to be black color. However, when seen from a direction different from the direction in which the projections are inclined, the pattern region appears to be brighter than when seen from the direction in which the projections are inclined. This means that when all the projections provided in the pattern region of the decorative portion are inclined in the same direction, the decorative portion will be directional for making the pattern region appear to be black color.

On the other hand, the decorative portion of this tire includes a plurality of the pattern regions, and in each of the plurality of the pattern regions, the projections are inclined in a different direction. Therefore, even when seen from a direction other than a specific direction, any of the pattern regions of the decorative portion appears to be black, and thus large contrast can be obtained between the pattern region and the other region.

In other words, when the decorative portion is seen from a plurality of directions, it is possible to make any of the pattern regions of the decorative portion appear to be black, whereby the decorative portion can be directionless.

A third aspect is the tire according to the first aspect, in which the decorative portion is formed at a tire side surface, and in the pattern region provided in the decorative portion, the projections are inclined toward an outer side in a tire radial direction with respect to a normal line perpendicular to the tire side surface.

In this tire, the decorative portion is provided at the tire side surface, and in the pattern region provided in the decorative portion, the projections are inclined toward the outer side in the tire radial direction with respect to the normal line perpendicular to the tire side surface. Therefore, the projections formed in the pattern region in the upper portion of the tire (upper portion of the tire rotation axis) face obliquely upward.

Accordingly, when the decorative portion in the upper portion at the tire side surface is seen from an obliquely upper side with respect to the tire side surface, the projections provided in the pattern region of the decorative portion can be seen from the projecting direction of the projections, whereby, as compared with a case where the decorative portion is seen from the vertical direction with respect to the tire side surface, the pattern region appears to be black.

This means that in this tire, large contrast can be obtained in the decorative portion on the upper side of the tire side surface.

A fourth aspect provides the tire according to the third aspect, in which the pattern region is provided at a tire maximum width portion of the tire side surface.

In this tire, since the pattern region is provided at the tire maximum width portion, when the maximum width portion on the upper side of the tire is seen from obliquely above a side portion of the tire, the projections in the pattern region provided at the tire maximum width portion can be seen from the projecting direction of the projections, whereby the pattern region in the maximum width portion on the upper side of the tire appears to be the blackest.

This means that in this tire, large contrast can be obtained when the decorative portion at the tire maximum width portion of the upper side of the tire side surface is seen from above the tire side surface.

A fifth aspect is the tire according to the second aspect, in which the decorative portion is formed at a tire side surface, in one of the plurality of pattern regions, the projections are inclined toward an outer side in a tire radial direction, and in another of the plurality of pattern regions, the projections are inclined in a different direction from the outer side in the tire radial direction.

When in one of the plurality of pattern regions, the projections are inclined toward an outer side in a tire radial direction, and in another of the plurality of pattern regions, the projections are inclined in a different direction from the outer side in the tire radial direction, the projections in the decorative portion at the tire side surface on the upper side of the tire rotation axis face obliquely upward.

When the decorative portion at the tire side surface on the upper side of the rotation axis is seen, the visual line direction and the inclination direction of the projections come close to each other or coincide with each other, whereby the portion in which the inclined projections are formed appears to be the blackest.

Advantageous Effects of Invention

According to the present disclosure, contrast can be obtained when a decorative portion of a tire is obliquely seen.

DESCRIPTION OF EMBODIMENTS

First Embodiment

One example of a tire according to a first embodiment of the present invention will be described with reference to FIGS. 1 to 5. Arrow C shown in the drawings indicates a tire circumferential direction and arrow R indicates a tire radial direction.

Figure 1A:
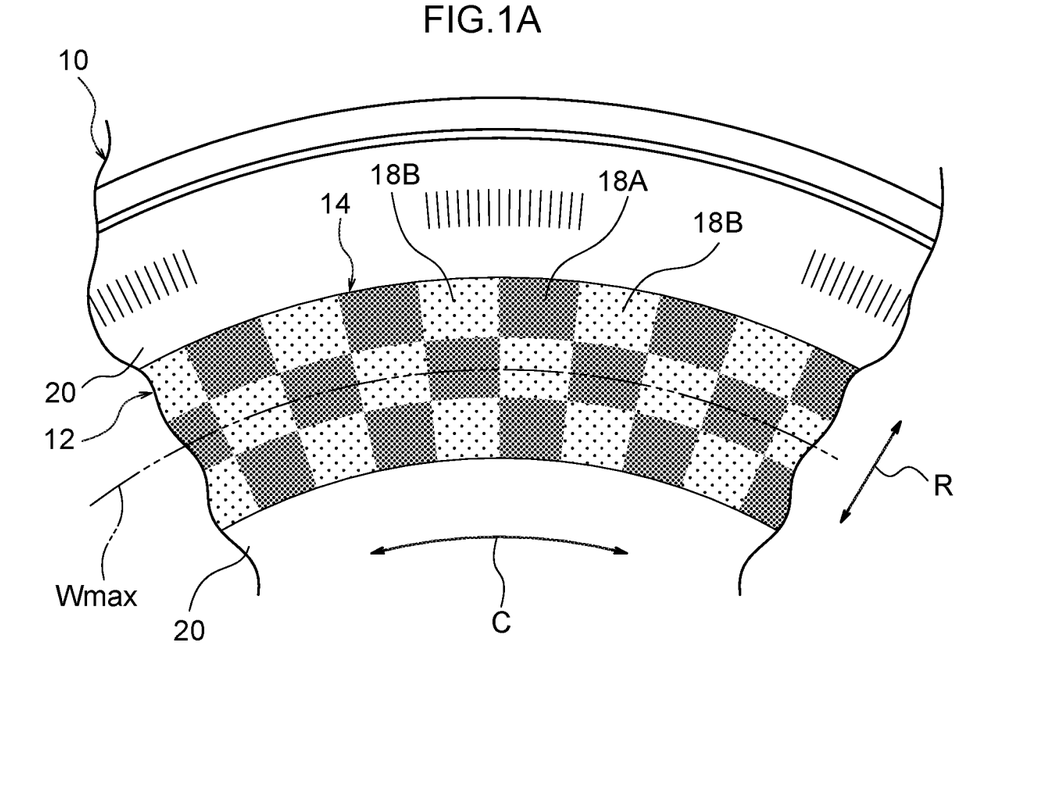
FIG. 1A is a perspective view of a side portion of a tire according to a first embodiment of the invention seen from obliquely above a rotation axis.

As shown in FIG. 1A, a tire side portion 12 of a tire 10 is provided with a decorative portion 14, when seen from an axial direction of the tire 10, striding over a tire maximum width portion Wmax in the tire radial direction and having an annular shape that extends continuously in the tire circumferential direction.

In the decorative portion 14, a flat base surface 30 (see FIG. 1B) is formed that recesses by a constant dimension with respect to another region 20 in which projections described later or the like are not formed in regions other than the decorative portion 14 in the tire side portion 12. In the embodiment, the base surface 30 is recessed by 0.45 mm with respect to the other region 20 of the tire side portion 12. The base surface 30 of the embodiment has the same surface roughness as that of the other region 20.

(First Low Brightness Region 18A, and Second Low Brightness Region 18B)

In the decorative portion 14, a first low brightness region 18A and a second low brightness region 18B whose brightness is lower than the other region 20 and that appear to be black color are alternately formed in the tire circumferential direction and the tire radial direction. The first low brightness region 18A and the second low brightness region 18B are examples of the pattern region. The first low brightness region 18A and the second low brightness region 18B pf the embodiment each have a rectangular shape in plan view.

In a mold (metal mold) for forming the tire 10, irregularities are provided in portions corresponding to the first low brightness region 18A and the second low brightness region 18B to form the first low brightness region 18A and the second low brightness region 18B.

Hereinafter, the first low brightness region 18A will be representatively described.

Figure 2:
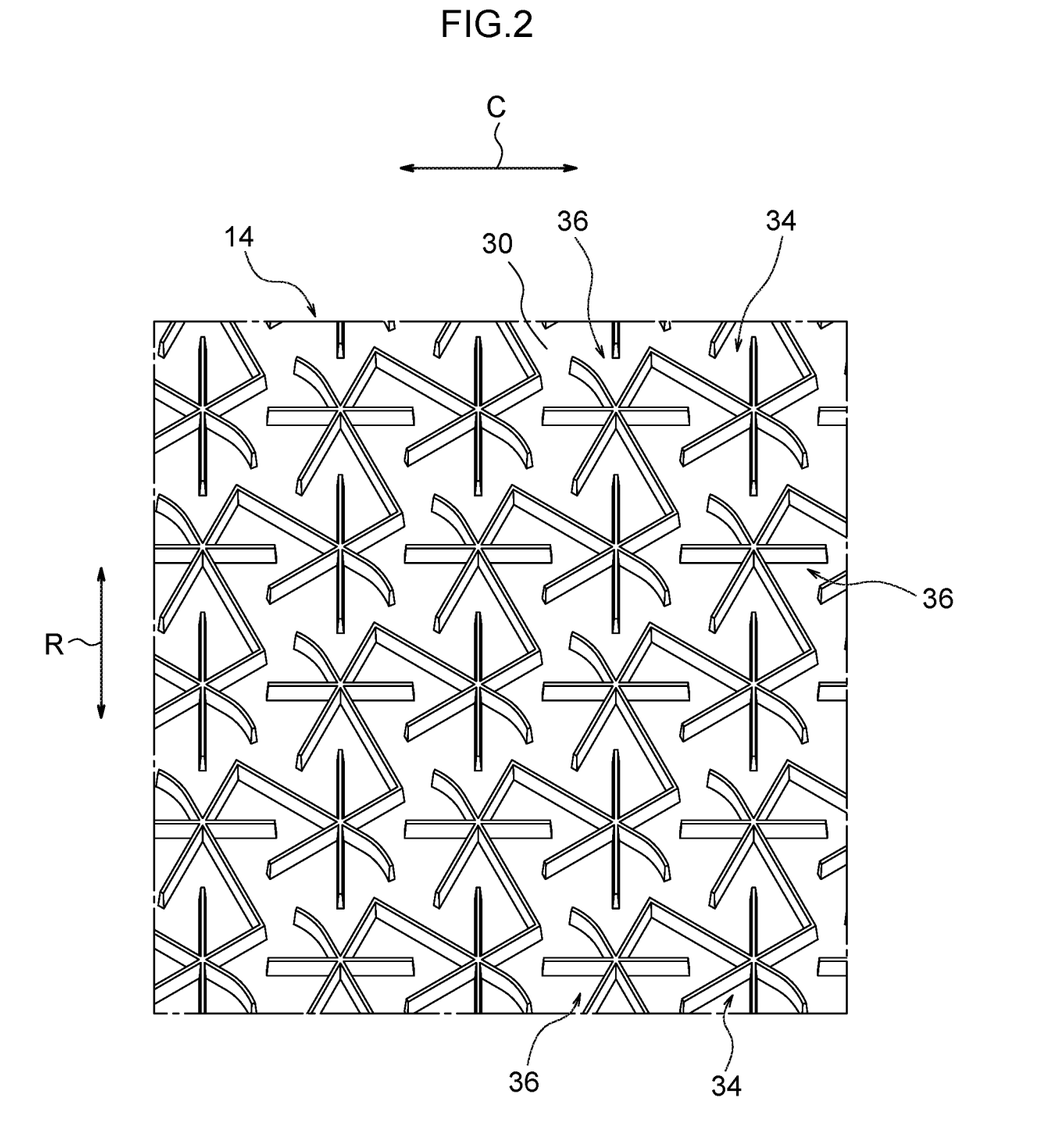
FIG. 2 is a plan view showing a first low brightness region of a decorative portion of the tire according to the first embodiment of the invention.
Figure 3:
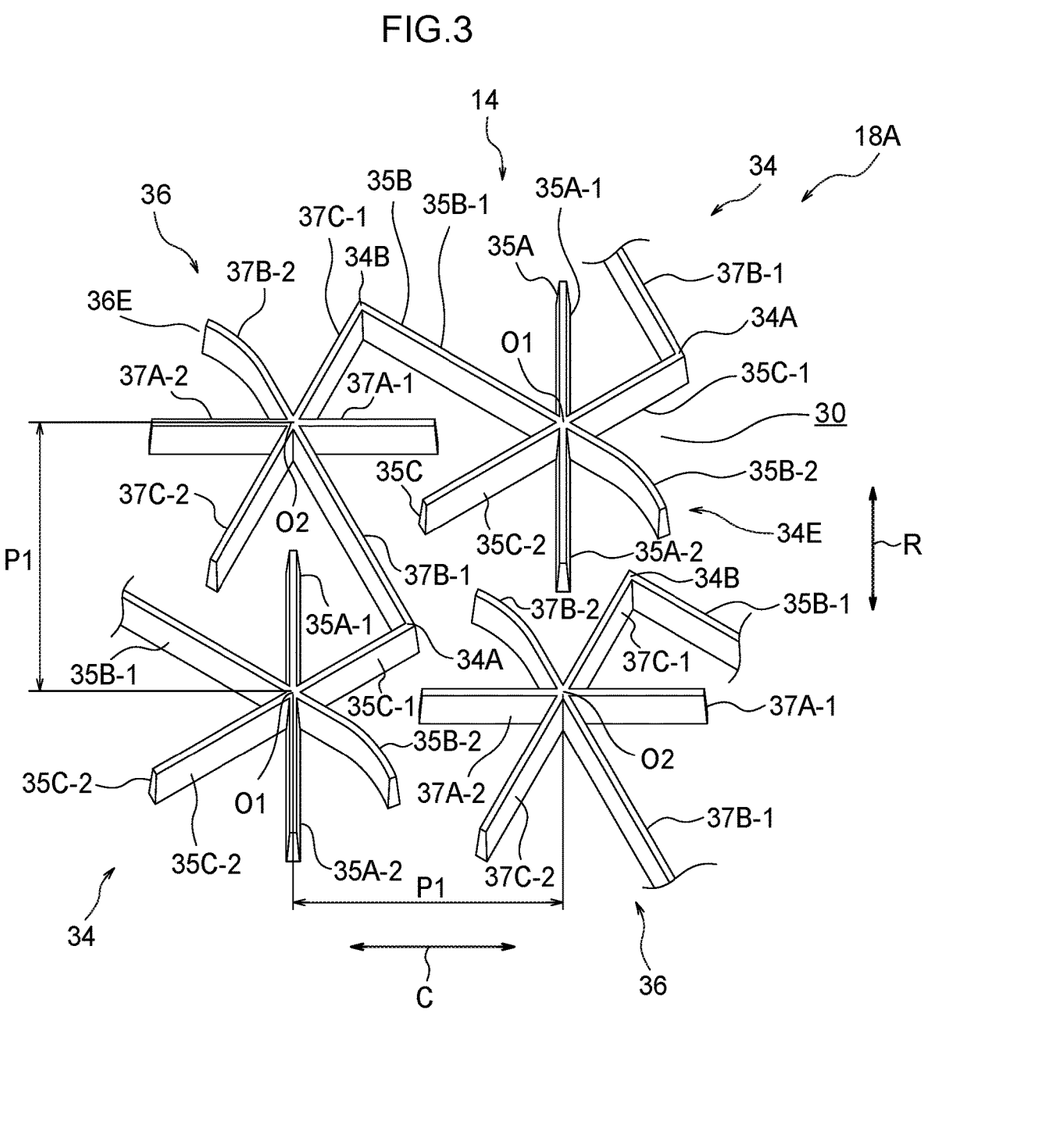
FIG. 3 is an enlarged plan view showing projections formed in the first low brightness region of the decorative portion of the tire according to the first embodiment of the invention.

As shown in FIGS. 2 to 3, the first low brightness region 18A includes a plurality of first asterisk projections 34 and a plurality of second asterisk projections 36 projecting from the base surface 30. The first asterisk projections 34 and the second asterisk projections 36 are alternately disposed in the tire circumferential direction and the tire radial direction. The first asterisk projections 34 and the second asterisk projections 36 are examples of the projection.

[First Asterisk Projection 34]

As shown in FIG. 3, each of the first asterisk projections 34 is constituted of first extending portions 35A-1 and 35A-2, second extending portions 35B-1 and 35B-2, and third extending portions 35C-1 and 35C-2, each of which extends in a different direction from a center O1 serving as a base point when seen from a direction orthogonal to the base surface 30 (direction of a rotation axis of the tire 10). Hereinafter, these six extending portions are collectively referred to as "extending portion 34E". One extending portion 34E and another extending portion 34E (excluding extending portions extending in mutually reverse directions from the center O1) constitute a line shape bent at the center O1.

The first extending portion 35A-1 and the first extending portion 35A-2 extend in mutually reverse directions from the center O1, and the first extending portion 35A-1 and the first extending portion 35A-2 constitute a shape that continuously extend in a straight line. The first extending portion 35A-1 extends to the outer side in the tire radial direction from the center O1, and the first extending portion 35A-2 extends to the inside in the tire radial direction from the center O1. The first extending portion 35A-1 and the first extending portion 35A-2 have the same length. Hereinafter, the first extending portion 35A-1 and the first extending portion 35A-2 are collectively referred to as "first extending portion 35A".

The second extending portion 35B-1 and the second extending portion 35B-2 extend in mutually reverse directions from the center O1, and the second extending portion 35B-1 and the second extending portion 35B-2 constitute a shape that continuously extend in a straight line. The second extending portion 35B-1 and the second extending portion 35B-2 are inclined with respect to the tire circumferential direction so that an end on one side (left side of the drawing) in the tire circumferential direction is located outer side in the tire radial direction as compared with an end on the other side (right side in the drawing).

The second extending portion 35B-1 extends to the one side in the tire circumferential direction from the center O1, and the second extending portion 35B-2 extends to the other side in the tire circumferential direction from the center O1. The second extending portion 35B-1 is longer than the second extending portion 35B-2. A portion on a tip side of the second extending portion 35B-2 is curved to the inside in the tire radial direction. Hereinafter, the second extending portion 35B-1 and the second extending portion 35B-2 are collectively referred to as "second extending portion 35B".

The third extending portion 35C-1 and the third extending portion 35C-2 extend in mutually reverse directions from the center O1, and the third extending portion 35C-1 and the third extending portion 35C-2 constitute a shape that continuously extend in a straight line. The third extending portion 35C-1 and the third extending portion 35C-2 are inclined with respect to the tire circumferential direction so that an end on the one side (left side of the drawing) in the tire circumferential direction is located inside in the tire radial direction as compared with an end on the other side (right side in the drawing).

The third extending portion 35C-1 extends to the other side in the tire circumferential direction from the center O1, and the third extending portion 35C-2 extends to the one side in the tire circumferential direction from the center O1. The third extending portion 35C-1 is shorter than the third extending portion 35C-2. Hereinafter, the third extending portion 35C-1 and the third extending portion 35C-2 are collectively referred to as "third extending portion 35C".

Six extending portions 34E each form an angle of 60° together with an adjacent extending portion 34E. In other words, the first asterisk projections 34 each have a shape in which six extending portions 34E extend radially from the center O1.

Figure 4:
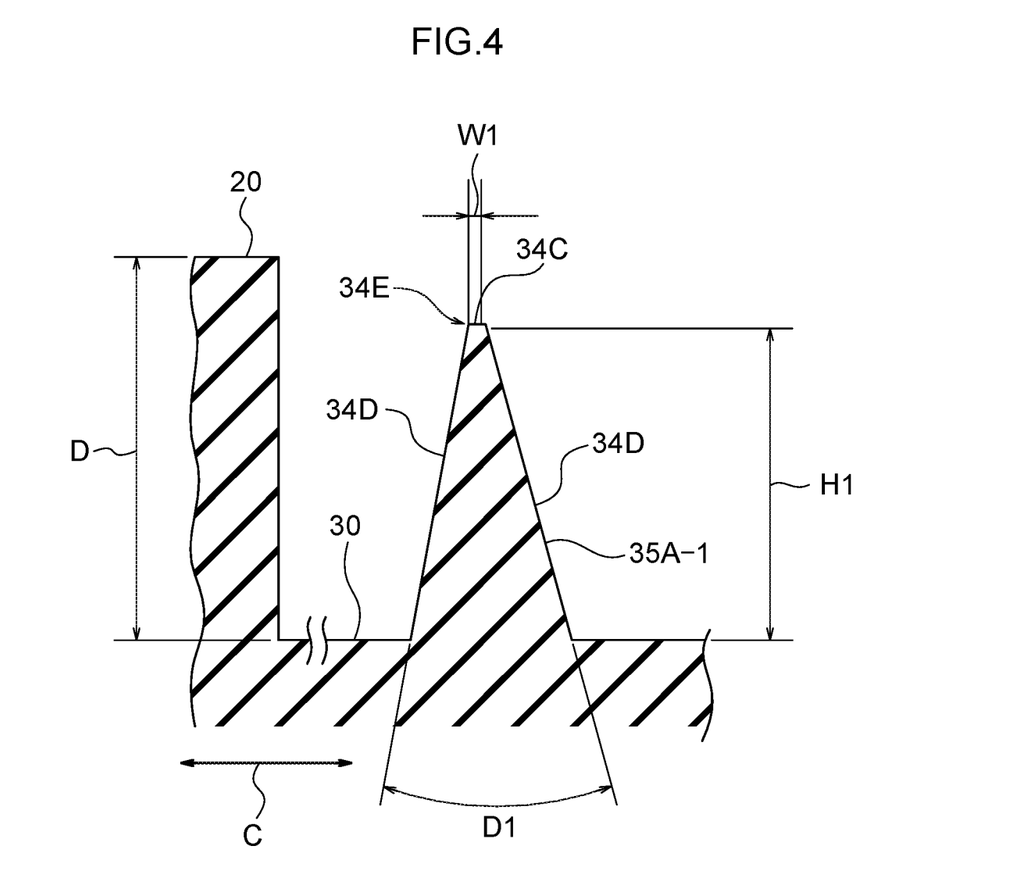
FIG. 4 is a sectional view showing an extending portion extending in a tire radial direction of a first asterisk projection formed in the first low brightness region of the decorative portion of the tire according to the first embodiment of the invention.

In FIG. 4, a cross section of the first extending portion 35A-1 in the tire circumferential direction that extends along the one side in the tire radial direction is shown representatively among the extending portions 34E of the first asterisk projections 34. As shown in FIG. 4, in the first extending portion 35A-1, the cross section in a direction orthogonal to an extending direction has a triangle shape having a flat top surface 34C. This means that the first asterisk projections 34 include the top surface 34C and a pair of side surfaces 34D. In the embodiment, the width of the top surface 34C of an extending portion 34E (W1 in the drawing) is 0.02 mm, and an apex angle (D1 in the drawing) of the extending portion 34E is 26 [°].

The height (H1 in the drawing) of the first asterisk projections 34 measured from the base surface 30 is set to one predetermined value of from 0.1 mm to 1.0 mm. When the height of the projections (projecting height) is less than 0.1 mm, it is difficult to form a projection, and the brightness may not be lowered to such a degree that the first low brightness region 18A appears to be black color through causing of the incident light to decline (details will be described later). Since the height of the projections is set to 1.0 mm or less, a difference between the rigidity of projection portions and the rigidity of portions around the projections is reduced so that local concentration of stress is suppressed.

The height of the projections in the embodiment and a dimension of an interval (pitch) or the like between the projections described later can be measured using, for example, VR-3000 One-Shot 3D Measuring Macroscope by KEYENCE CORPORATION.

[Second Asterisk Projection 36]

As shown in FIG. 3, second asterisk projections 36 each have a shape similar to the shape of the first asterisk projections 34. Specifically, second asterisk projections 36 each have a shape of the first asterisk projections 34 vertically inverted after being rotated by 90 [°] clockwise around the center O1 when seen from the direction orthogonal to the base surface 30.

In the second asterisk projections 36, portions corresponding to the first extending portions 35A-1 and 35A-2, the second extending portions 35B-1 and 35B-2, the third extending portions 35C-1 and 35C-2, and the center O1 of the first asterisk projections 34 are referred to as first extending portions 37A-1 and 37A-2, second extending portions 37B-1 and 37B-2, third extending portion 37C-1 and 37C-2, and a center O2, respectively. Hereinafter, these six extending portions are collectively referred to as "extending portion 36E".

A height H1 and an apex angle D1 of the second asterisk projections 36 are specified in the same manner as the height H1 and the apex angle D1 of the first asterisk projections 34.

Here, in the decorative portion 14 of the embodiment, the entire extending portions 34E of the first asterisk projections 34 and the entire extending portions 36E of the second asterisk projections 36 are inclined toward the outer side in the tire radial direction.

Figure 5:
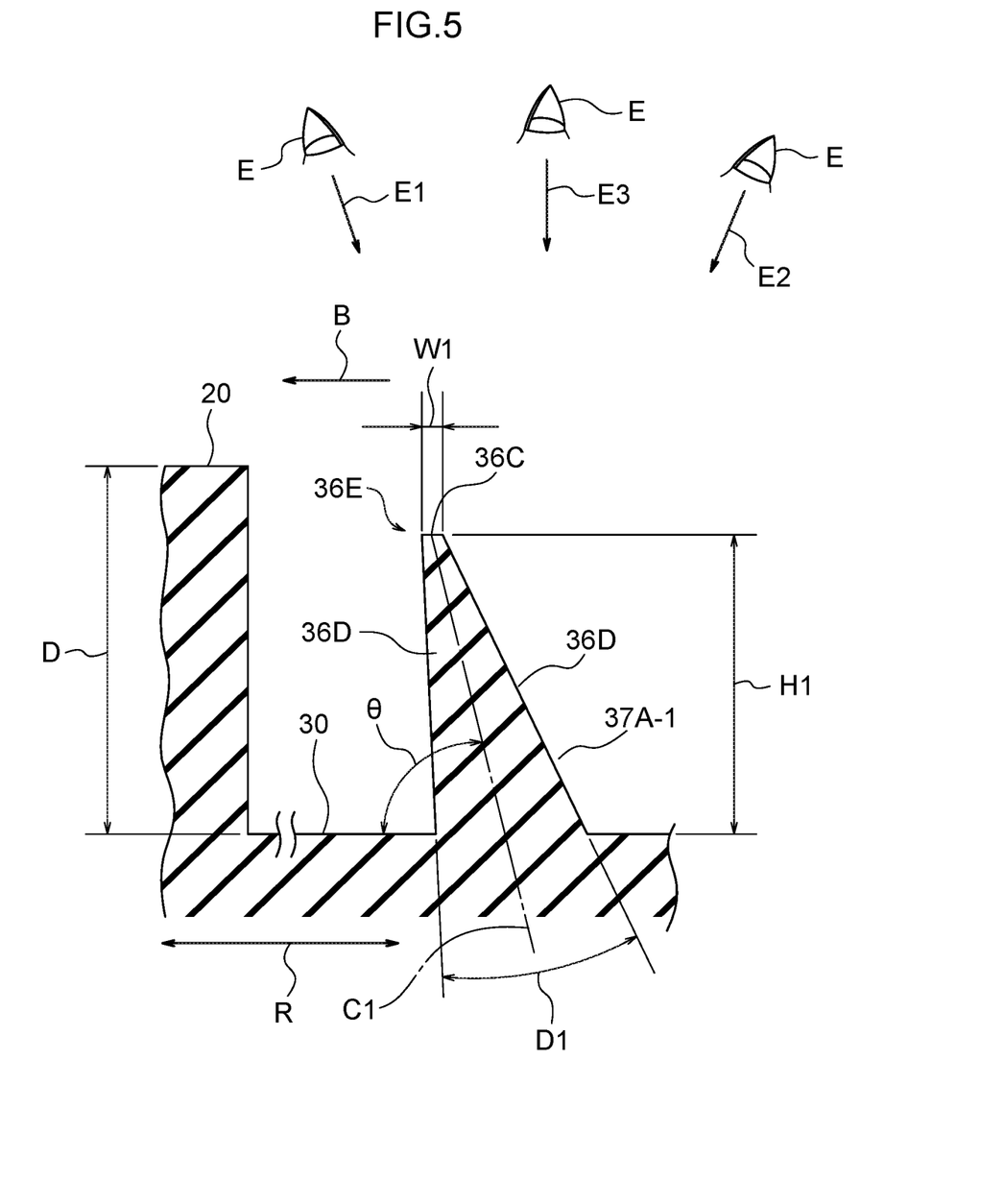
FIG. 5 is a sectional view showing an extending portion extending in a tire circumferential direction of the first asterisk projection formed in the first low brightness region of the decorative portion of the tire according to the first embodiment of the invention.

In FIG. 5, a cross section of the first extending portion 37A-1 in the tire radial direction that extends along the tire circumferential direction is shown representatively among the extending portions 36E of the second asterisk projections 36. As shown in FIG. 5, the first extending portion 37A-1 is inclined toward the outer side in the tire radial direction (direction of arrow B) (inclination angle of a center line C1 in the width direction (thickness direction) of the first extending portion 37A-1 with respect to the base surface 30 is θ°).

As shown in FIG. 5, an extending portion 36E that extends along the tire circumferential direction as the first extending portion 37A-1 does is inclined toward one of the side surfaces 36D, of the extending portion 36E, which is outer side in the tire radial direction. However, an extending portion 34E that extends along the tire radial direction as the first extending portion 35A-1 does is not inclined toward any one of the side surfaces 34D, as shown in FIG. 4.

Although not shown, an extending portion 34E that extends along a direction inclined with respect to the tire circumferential direction is inclined toward one of the side surfaces 34D, which is outer side in the tire radial direction, and in the same manner, an extending portion 36E that extends along a direction inclined with respect to the tire circumferential direction is inclined toward one of the side surfaces 36D, which is outer side in the tire radial direction.

Since the entire first asterisk projections 34 are inclined toward the outer side in the tire radial direction, with respect to an inclination angle θ of the extending portions 34E, the inclination angle θ of the extending portions 34E that extend along the tire circumferential direction is the largest (for example, 30°), the inclination angle θ gradually decreases as the direction along which the extending portions 34E extend comes closer to the tire circumferential direction, and the inclination angle θ reaches zero when the direction along which the extending portions 34E extend is the tire circumferential direction (see FIG. 4).

[Others]

As shown in FIGS. 2 and 3, the first asterisk projections 34 and the second asterisk projections 36 are alternately disposed in the tire circumferential direction and the tire radial direction and fill the entire first low brightness region 18A.

The tip of each of the first extending portions 35A-1 and 35A-2 of the first asterisk projections 34 is inserted into each of areas between the second extending portion 37B-2 and the third extending portion 37C-1, and between the second extending portion 37B-1 and the third extending portion 37C-2 of the adjacent second asterisk projections 36 in the tire radial direction. The tip of each of the first extending portions 37A-1 and 37A-2 of the second asterisk projections 36 is inserted into each of areas between the second extending portion 35B-1 and the third extending portion 35C-2, and between the second extending portion 35B-2 and the third extending portion 35C-1 of the adjacent first asterisk projections 34 in the tire circumferential direction.

The tip of the third extending portion 35C-1 of the first asterisk projections 34 is connected with the tip of the second extending portion 37B-1 of the second asterisk projections 36 disposed outer side in the tire radial direction with respect to the first asterisk projections 34. In this way, a connecting portion 34A is formed. The tip of the second extending portion 35B-1 of the first asterisk projections 34 is connected with the tip of the third extending portion 37C-1 of the second asterisk projections 36 disposed on the one side in the tire circumferential direction with respect to the first asterisk projections 34. In this way, a connecting portion 34B is formed.

In this configuration, the first asterisk projections 34 and the second asterisk projections 36 are connected with each other from the inside toward the outside in the tire radial direction through the connecting portions 34A and 34B in a step shape.

In the first asterisk projections 34 and the second asterisk projections 36 adjacent to each other in the tire radial direction and the tire circumferential direction, the interval (hereinafter, referred to as "interval P1") between the center O1 and the center O2 is set to one predetermined value of from 0.1 mm to 1.0 mm. When the interval P1 is less than 0.1 mm, it is difficult to form a projection. When the interval P1 is more than 1.0 mm, the brightness may not be lowered to such a degree that the first low brightness region 18A appears to be black color through causing of the incident light to decline as compared with the other region 20 other than the decorative portion 14 in the tire side portion 12 (details will be described later).

As shown in FIGS. 4 and 5, the height H1 of the first asterisk projections 34 and the height H1 of the second asterisk projections 36 each are preferably smaller than a depth dimension D (dimension from the surface of the other region 20 of the tire side portion 12 to the base surface 30) of the respective decorative portions 14. In other words, the first asterisk projections 34 and the second asterisk projections 36 preferably do not project from the surface of the other region 20 of the tire side portion 12.

Here, with respect to the first low brightness region 18A that appears to be black color described in the embodiment, the value of brightness L measured using a handy spectrophotometer manufactured by NIPPON DENSHOKU INDUSTRIES Co., LTD is, for example, in a range below 10. However, the value of the brightness L need not be below 10 as long as the first low brightness region 18A appears to be blacker than the other region 20 other than the decorative portion 14.

On the other hand, with respect to the other region 20 other than the decorative portion 14 in the tire side portion 12 (region in which the first asterisk projections 34 and the second asterisk projections 36 are not formed), the value of the brightness L measured using an handy spectrophotometer manufactured by NIPPON DENSHOKU INDUSTRIES Co., LTD is, for example, in a range larger than 20, but the brightness L may be 20 or less. This means that the first low brightness region 18 that appears to be black color is a region whose brightness is relatively low compared with that of the surrounding part on the outer surface of the tire 10.

In the second low brightness region 18B, the first asterisk projections 34 and the second asterisk projection 36 in the first low brightness region 18A are inclined toward the inside in the tire radial direction. In other words, the second low brightness region 18B is the first low brightness region 18A that is rotated by 180° in plan view. Therefore, illustration and detailed description of the second low brightness region 18B are omitted.

(Function and Effect)

Next, the function and the effect of the tire 10 according to the embodiment will be described.

In the other region 20 of the tire side portion 12 in which the first asterisk projections 34 and the second asterisk projections 36 are not formed, incident light is reflected to the outside by the outer surface that constitutes the other region 20.

On the other hand, in the first low brightness region 18A and the first low brightness region 18B provided in the decorative portion 14 of the tire side portion 12, light that enters the first asterisk projections 34 and the second asterisk projections 36 strikes the side surfaces 34D and the side surfaces 36D. The incident light declines while being repeatedly reflected between the side surfaces 34D and between the side surfaces 36D facing each other, and then is reflected to the outside.

Therefore, the amount of light reflected to the outside in the first low brightness region 18A and the second low brightness region 18B is smaller than the amount of light reflected to the outside in the other region 20 in which the first asterisk projections 34 and the second asterisk projections 36 are not formed, and thus the low brightness region 18 appears to be relatively black color compared with the other region 20.

As shown in FIG. 5, for example, when a case where the first low brightness region 18A is seen from the inclination direction of the extending portion 36E, in other words, the direction of the extended line of the center line C1 of the extending portion 36E (visual line E1. Sign E indicates an eye) is compared with a case where the first low brightness region 18A is seen from the direction opposite to the inclination direction of the extending portion 36E (visual line E2. Sign E indicates an eye) and a case where the first low brightness region 18A is seen in plan view (visual line E3. Sign E indicates an eye), the amount of light reflected in the direction opposite to the inclination direction of the extending portion 36E and the amount of light reflected in the vertical direction of the first low brightness region 18A are large compared with the amount of light reflected in the inclination direction of the extending portion 36E. This is because, in the extending portion 36E shown in FIG. 5, the angle of one of the side surfaces 36D, which is on the right side of the drawing, with respect to the visual lines E2 and E3 is large, whereby the amount of light reflected in the direction of an eye E on one of the side surfaces 36D, which is on the right side of the drawing, increases.

Figure 1B:
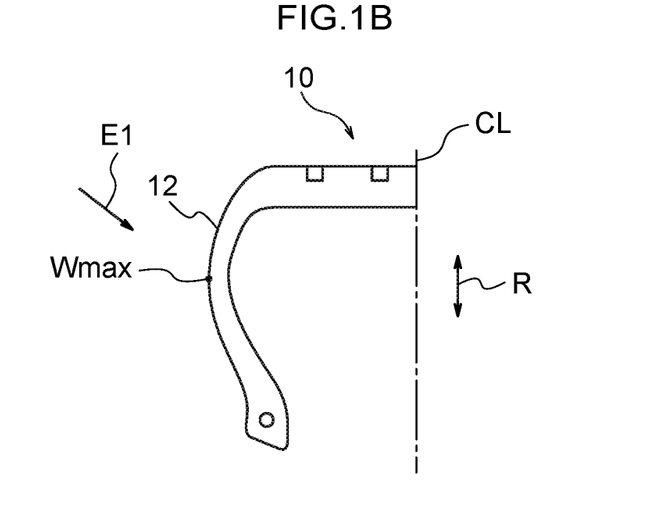
FIG. 1B is a sectional view of the tire according to the first embodiment along the rotation axis.

In the decorative portion 14 of the embodiment, the first asterisk projections 34 and the second asterisk projections 36 of the first low brightness region 18A are inclined toward the outer side in the tire radial direction and the first asterisk projections 34 and the second asterisk projections 36 of the second low brightness region 18B are disposed inside in the tire radial direction. Therefore, as shown in FIG. 1B, for example, in the decorative portion 14 that strides over the tire maximum width portion Wmax located on the upper side of the rotation axis of the tire 10, when the tire maximum width portion Wmax is seen from obliquely above, the direction of the visual line E1 and the direction in which the first asterisk projections 34 and the second asterisk projections 36 of the first low brightness region 18A are inclined come close to each other or coincide with each other. As a result, the first low brightness region 18A appears to be blacker than the other region 20 and the second low brightness region 18B, whereby large contrast can be obtained between the first low brightness region 18A and the other region 20.

In other words, for example, when a person moves his or her visual line obliquely downward to see the tire 10 mounted on a vehicle from above while standing, as shown in FIG. 1A, in the decorative portion 14, in the tire side portion 12, in the upper portion of the tire rotation axis, the first low brightness region 18A can be made to appear to be the blackest, whereby large contrast can be obtained.

The first asterisk projections 34 and the second asterisk projections 36 are connected with each other through the connecting portions 34A and 34B in a step shape. In this way, the first asterisk projections 34 and the second asterisk projections 36 support each other through the connecting portions 34A and 34B and falling of the first asterisk projections 34 and the second asterisk projections 36 can be suppressed, whereby the durability can be improved.

Second Embodiment

Next, one example of a tire according to a second embodiment of the present invention will be described with reference to FIG. 6. Note that the same components as those of the first embodiment are denoted by the same reference numerals, and description thereof will be omitted.

In the embodiment described above, the decorative portion 14 is provided on the tire side portion 12 of the tire 10. Alternatively, as shown in FIG. 6, the decorative portion 14 may be provided at a groove bottom of a groove 42 formed in a tread 40.

Figure 6:
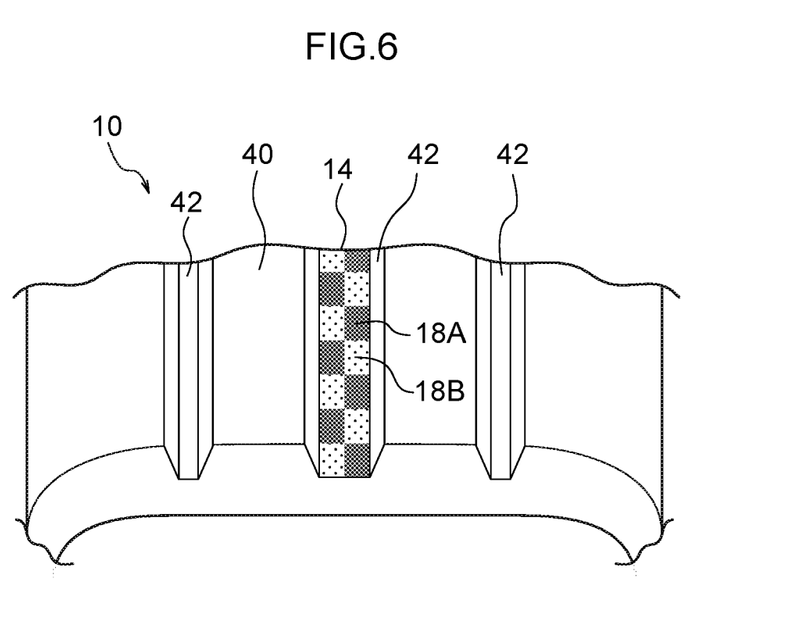
FIG. 6 is a perspective view of a tread showing a decorative portion of a tire according to a second embodiment of the invention.

In the decorative portion 14 shown in FIG. 6, the first asterisk projections 34 and the second asterisk projections 36 in the first low brightness region 18A are inclined toward the front side in the drawing in the tire circumferential direction, and the first asterisk projections 34 and the second asterisk projections 36 of the second low brightness region 18B are inclined in the direction opposite to the first low brightness region 18A. Therefore, as shown in FIG. 6, when the decorative portion 14 in the groove 42 of the tire 10 is seen from the tire circumferential direction in an oblique direction, the first low brightness region 18A appears to be black color compared with a treading surface of the tread 40, whereby large contrast can be obtained.

Third Embodiment

Next, one example of a tire according to a third embodiment of the present invention will be described with reference to FIGS. 7 and 8. Note that the same components as those of the embodiments described above are denoted by the same reference numerals, and description thereof will be omitted.

Figure 7:
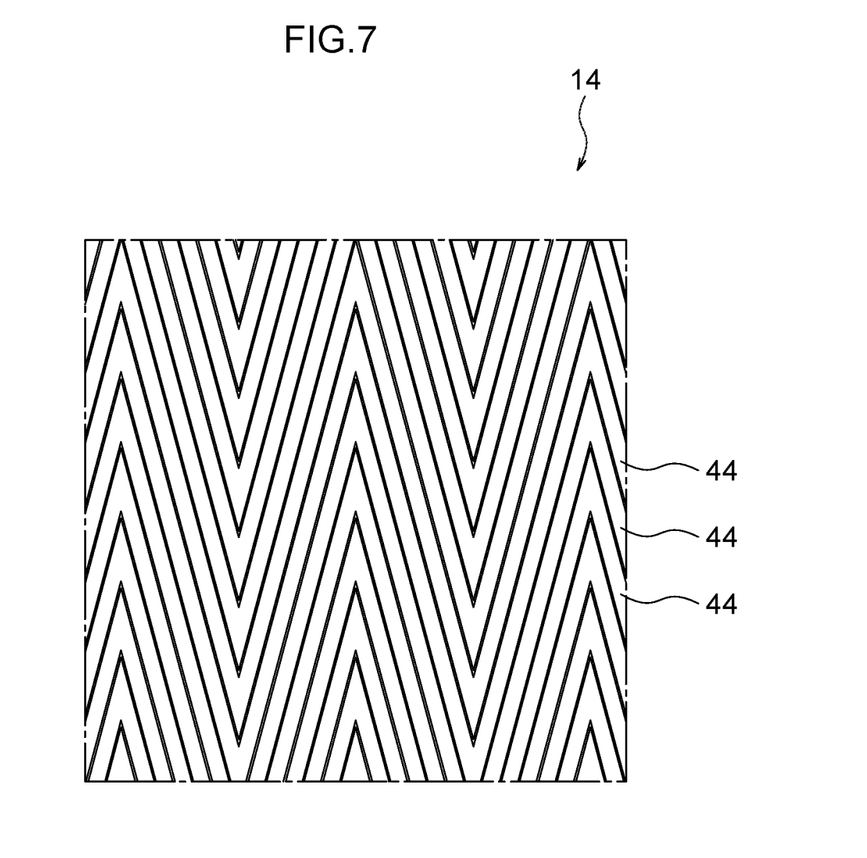
FIG. 7 is a plan view showing a decorative portion of a tire according to a third embodiment of the invention.
Figure 8:
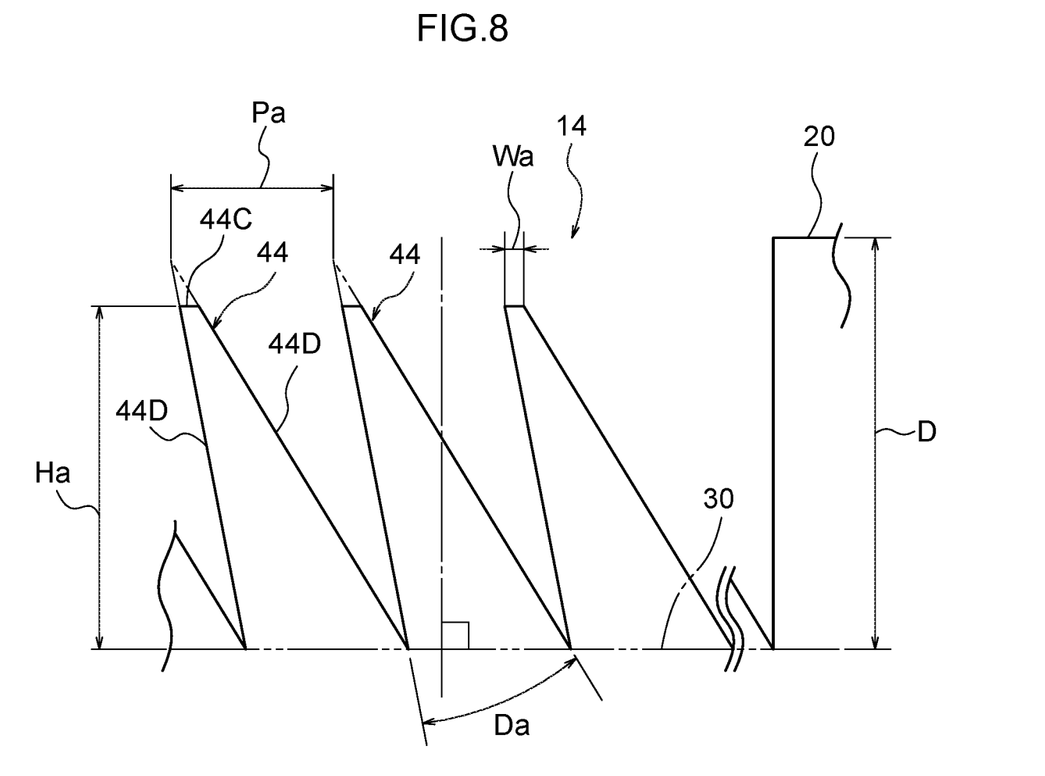
FIG. 8 is a sectional view of rib projections formed in a low brightness region.

As shown in FIGS. 7 and 8, the base surface 30 of the decorative portion 14 of the embodiment is provided with a plurality of rib projections 44 instead of the first asterisk projections 34 and the second asterisk projections 36 of the first embodiment. As shown in FIG. 7, the rib projections 44 are formed in a zigzag shape in plan view of the decorative portion 14. The rib projections 44 are examples of the projection.

As shown in FIG. 8, in each of the rib projections 44, the cross section in the direction orthogonal to the extending direction has a triangle shape having a flat top surface 44C. This means that the rib projections 44 each include the top surface 44C and a pair of side surfaces 44D. In the embodiment, the width of the top surface 44C (Wa in the drawing) is 0.02 mm, and an apex angle (Da in the drawing) of the rib projections 44 is 26 [°]. The height (Ha in the drawing) of the rib projections 44 measured from the base surface 30 is set to one predetermined value of from 0.1 mm to 1.0 mm.

In the rib projections 44 adjacent to each other, the interval (interval Pa) between one of the rib projections 44 and the other one of the rib projections 44 is set to one predetermined value of from 0.1 mm to 1.0 mm.

The rib projections 44 provided in the decorative portion 14 of the embodiment are different in shape from the first asterisk projections 34 and the second asterisk projections 36 of the first embodiment. However, by the same principle as the first embodiment, light that enters the rib projections 44 declines while being repeatedly reflected between the side surfaces 44D facing each other, and then is reflected to the outside. In this way, the amount of light reflected to the outside in the decorative portion 14 of the embodiment is smaller than the amount of light reflected to the outside in the other region 20 in which the rib projections 44 are not formed, and thus the decorative portion 14 appears to be relatively black color compared with the other region 20.

In the low brightness region 18 of the embodiment, when a case where the decorative portion 14 is seen from the inclination angle of the rib projections 44 is compared with a case where the decorative portion 14 is seen in plan view and a case where the decorative portion 14 is seen from the direction opposite to the inclination direction of the rib projections 44, the decorative portion 14 appears to be the blackest when seen from the inclination direction of the rib projections 44. Therefore, the rib projections 44 are inclined in a direction from which large contrast is to appear.

Other Embodiments

The present invention has been described in detail with respect to specific embodiments. However, the present invention is not limited to the above embodiments, and it is apparent to those skilled in the art that various other embodiments are possible within the scope of the present invention.

In the above embodiments, the first low brightness region 18A having a rectangular shape is exemplified. However, the shape of the first low brightness region 18A is not limited to a rectangular shape, may be a shape other than a rectangular shape such as a triangle shape, a polygonal shape having five or more corners, a circular shape, or an ellipse, and may be a character, a number, a symbol, a logo, a pattern, or the like. In any case, the first low brightness region 18A can be made to appear to be black color so as to provide large contrast and stand out, in other words, improve the visibility. The inclination angle $\theta$ of the extending portions 34E is changed as appropriate corresponding to a direction from which the first low brightness region 18A is to appear to be black color.

The shape of the projections is not limited to the shape of the first asterisk projections 34 or the second asterisk projections 36 of the first embodiment, or the shape of the rib projections 44 of the third embodiment, and may be another shape. Regardless of the shape of the projections, the feature of the present disclosure is to incline the projections in a direction from which large contrast is to appear.

The decorative portion 14 of the above embodiments is provided with the first low brightness region 18A and the second low brightness region 18B in which the projections are inclined toward mutually opposite directions. Alternatively, the decorative portion 14 may be provided with three or more low brightness regions each of which includes the projections inclined in a different direction. In addition, the inclination angle $\theta$ of the projections may be changed for each low brightness region.

The disclosure of Japanese Patent Application No. 2017-239749 filed on Dec. 14, 2017 is incorporated herein by reference in its entirety.

All documents, patent applications, and technical standards mentioned in this specification are incorporated herein by reference to the same extent as if each individual document, patent application, and technical standard were specifically and individually stated to be incorporated herein by reference.

The invention claimed is:

1. A tire, comprising:
a decorative portion that is formed on an outer surface of the tire and that has a base surface; and
a pattern region that is provided at the decorative portion and that includes a plurality of projections projecting from the base surface and formed at an interval of from more than 0.1 mm to 1.0 mm, the plurality of projections having a height of from 0.1 mm to 1.0 mm,
wherein each of the plurality of projections is formed to include a plurality of extending portions each having a triangular cross section in a direction orthogonal to an extending direction and respectively extending in different directions along the base surface with a base point as a center,
wherein at least in the pattern region,
the plurality of projections include a plurality of first projections and a plurality of second projections,
each of the plurality of first projections including first extending portions of the plurality of extending portions, the first extending portions extending in a radial direction of the tire,
each of the plurality of second projections including second extending portions of the plurality of extending portions, the second extending portions extending in a circumferential direction of the tire,
the triangular cross section of each of the plurality of first extending portions is not inclined with respect to a normal line perpendicular to the base surface, and
the triangular cross section of each of the plurality of second extending portions is inclined with respect to the normal line perpendicular to the base surface.

2. The tire according to claim 1, wherein the decorative portion is provided with a plurality of the pattern regions, and in each of the plurality of the pattern regions, the projections are inclined in a different direction.

3. The tire according to claim 1, wherein:
the decorative portion is formed at a tire side surface.

4. The tire according to claim 3, wherein the pattern region is provided at a tire maximum width portion of the tire side surface.

* * * * *